United States Patent [19]
Koike et al.

[11] Patent Number: 5,506,725
[45] Date of Patent: Apr. 9, 1996

[54] TRANSMISSION TYPE CONFOCAL LASER MICROSCOPE

[75] Inventors: Hiroshi Koike, Tokyo; Shoji Suzuki, Fuchu, both of Japan

[73] Assignee: Koike Seiki Co., Ltd., Tokyo, Japan

[21] Appl. No.: 365,433

[22] Filed: Dec. 28, 1994

[51] Int. Cl.$^6$ .................................... G02B 21/06
[52] U.S. Cl. .................. 359/388; 359/368; 359/385
[58] Field of Search .................. 359/368–390, 359/227.2; 351/206, 212, 243

[56] References Cited

U.S. PATENT DOCUMENTS 2,601,175  6/1952  Smith ............................ 359/385

FOREIGN PATENT DOCUMENTS 257351  4/1991  Japan ............................ 359/368
288992  11/1993 Japan ............................ 359/386

*Primary Examiner*—Thong Q. Nguyen
*Attorney, Agent, or Firm*—Armstrong, Westerman, Hattori, McLeland & Naughton

[57] ABSTRACT

A transmission type confocal laser microscope has a transmission side objective lens below a specimen stage, which comprises an objective lens unit which is movable in an optical axis direction and a fixed relay lens unit, wherein movement of the objective lens unit for focus adjustment will not change the optical path after the relay lens unit. The microscope further includes an optical path switch on an optical path in the rear of the transmission side objective lens for switching between the optical path to the concave mirror and another optical path; and a target in a position optically equivalent to the concave mirror, which is illuminated by a light source for adjusting the transmission side objective lens for focusing.

4 Claims, 3 Drawing Sheets

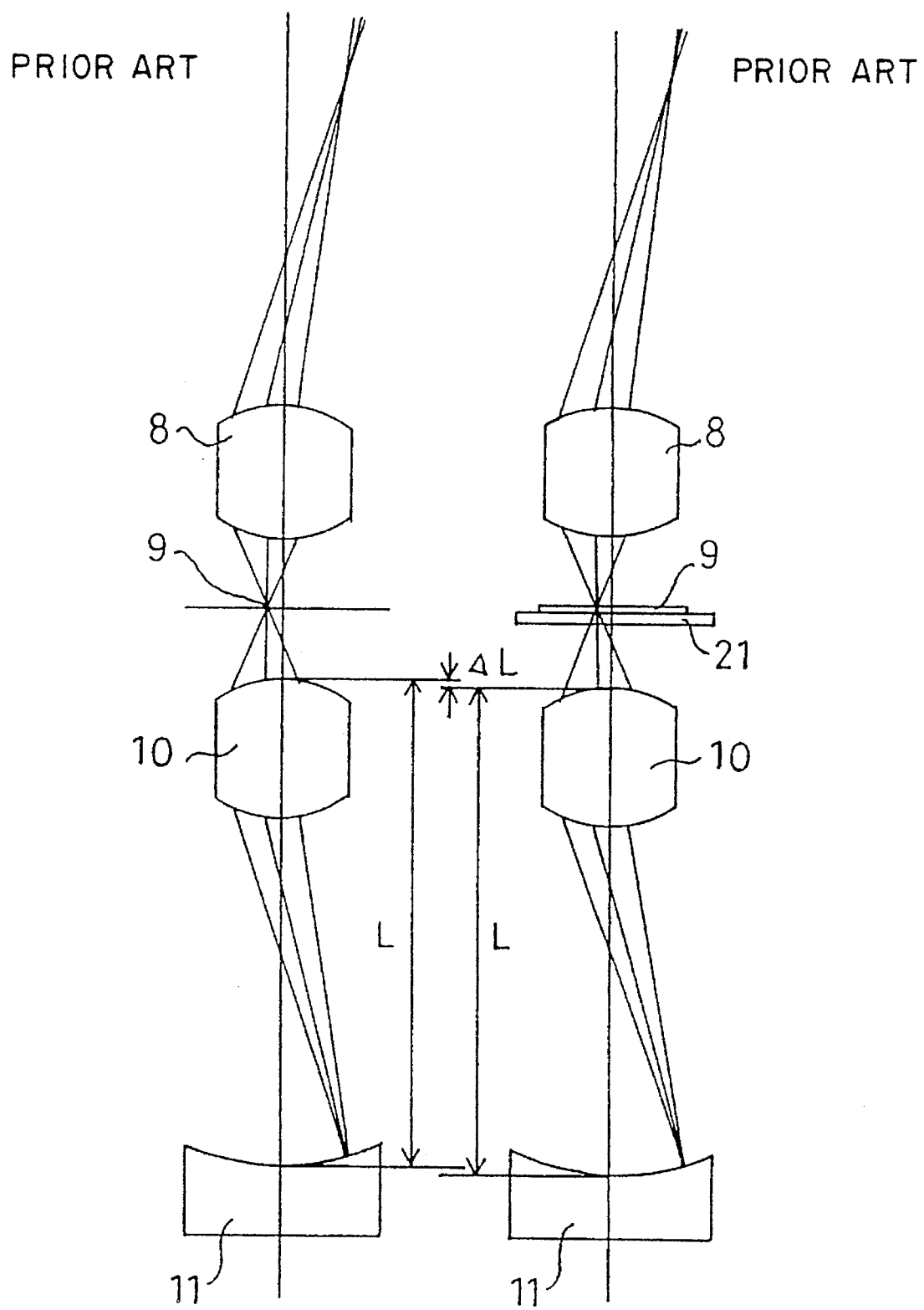

TRANSMISSION TYPE CONFOCAL LASER MICROSCOPE

BACKGROUND OF THE INVENTION

1. Field of the Invention

The present invention relates to a laser microscope and, in particular, to a transmission type confocal laser microscope which forms an image of a transmitted light from a specimen.

2. Description of the Related Art

Confocal laser microscopes generally scan a laser light spot which is focused to a size of about 1 micron along a specimen. A light having a brightness or darkness in individual positions (points) is detected by a photoelectric transducing sensor. A converted electric signal is integrated for displaying it on a large screen of a monitor display. This type of confocal laser microscope has an advantage in that defocussed light or spurious light can be eliminated since the specimen is always illuminated in only individual desired positions so that unnecessary spurious light is not mixed with a desired light and since light is received through a pinhole having a size which is substantially equal to that of the specimen scanning spot light in a position which is in a conjugate position for specimen plane. Accordingly, confocal laser microscopes provide a higher resolution and contrast in comparison with conventional optical microscopes even if the same objective lens is used.

Confocal laser microscopes are classified into two types, i.e., a reflection type laser microscope in which light reflected from a specimen is imaged and a transmission type laser microscope in which light transmitted through a specimen is imaged. A typical structure of the conventional transmission type confocal laser microscope is schematically shown in FIG. 2. This type of laser microscope emits a polarized laser light from a light source 1. The flux of the light is enlarged by an expander 2 and is transmitted through a polarized beam splitter 3 and is scanned in a transverse (X) direction and in a vertical (Y) direction by means of Galvano-mirrors 4 and 5 which are Galvanometers with mirrors. The light is once converged by a relay lens 8 in a position of a field stop 7 (corresponding to an imaging point of an objective lens). The light is transmitted through an illumination side objective lens B and is scanned on and along a specimen 9 as a spot.

The laser light which has been transmitted through the specimen 9 is transmitted through a transmission side objective lens 10 which is optically equivalent to the illumination side objective lens 8 and is imaged on the surface of a concave mirror 11. The concave mirror 11 has a reflective mirror surface which is spherical around the pupil position of the transmission side objective lens 10. The light flux which is reflected on the mirror 11 is returned via the same optical path. A ¼λ wave length plate 12 which changes the polarization direction by 45° is provided between the concave mirror 11 and the transmission side objective lens 10. The reflected laser light is incident upon the above mentioned polarized beam splitter 3. Only the light which was transmitted twice through the ¼λ wave length plate 12 is reflected and is bent in a normal direction by the splitter 3. The split and bent light is transmitted through a condenser lens 13 and a pin-hole 14 is incident upon a specimen signal detecting sensor 15 comprising light receiving elements. The detected signal is photoelectrically converged into an electric signal and is then fed to a memory.

In the drawings, reference numeral 16 denotes a binocular head; 17 an optical path switch which is used when the binocular head is used; 18 a light source for vertical overhead illumination; and 19 a relay lens for the light source In order to use the conventional type confocal laser microscope, a preparation 21 is firstly placed on a specimen stage 20 as shown in FIG. 3. Light is focussed on the surface of the specimen 9 by the illumination side objective lens 8. It is necessary to shift or displace the transmission side objective lens 10 by a slight length (L) each time when the transmission side objective lens 10 is adjusted since the level of the specimen is different depending upon the thickness of the preparation 21. The thickness of the glass portion of the preparation usually has variations within about ±0.3 mm among the different preparations.

Accordingly, the optical path changer 17 is conventionally switched to move toward an optical microscope unit which is on the side of the binocular head 16. Light from the light source 18 for vertical overhead illumination is focussed on the specimen by adjusting the illumination side objective lens 8. The image of the light reflected from the concave mirror 11 is superposed upon the image of the light reflected from the specimen by adjusting the transmission side objective lens 10. Thereafter, the optical path switch 17 is switched to the laser light side.

Alternatively, the transmission side objective lens 10 is preliminarily adjusted to a position suitable for the preparation having a standard thickness. Focussing is achieved by means of the optical microscope unit including the illumination side objective lens 8. Light is then switched to laser light. The transmission side objective lens 10 is finely adjusted to provide the highest resolution while observing the image on the synthetic monitor.

Such conventional systems have a problem in that focussing adjustment by means of the transmission side objective lens 10 is troublesome and focussing accuracy is low, resulting in difficulty in providing a high resolution.

The present invention was made to overcome the above mentioned problem.

It is an object of the present invention to provide a transmission type confocal laser microscope in which adjustment of the transmission side objective lens for focussing can be achieved easily, accurately and stably.

SUMMARY OF THE INVENTION

In one aspect of the present invention, there is provided a transmission type confocal laser microscope in which a laser spot light which is condensed through an illumination side objective lens is incident and scanned on a specimen from a face side thereof, a light which is transmitted through the specimen to the reverse side thereof and is reflected on a concave mirror located on a focal point of a transmission side objective lens which is optically equivalent to the illumination side objective lens and is returned along the same optical path so that returned light is received by an photoreceiving element, characterized in that it further includes an optical path switch behind the transmission side objective lens for switching between the optical path to said concave mirror and another optical path different from the former optical path; and a target which is illuminated with a light source for adjusting the transmission side objective lens, said target being located on said another optical path in a position optically equal to said concave mirror.

Said objective lens may comprise an objective lens unit which is movable in a direction of an optical axis and a fixed relay lens unit, wherein movement of the objective lens unit for focus adjustment will not cause the optical path after the relay lens unit to be changed.

The optical path on which the transmission side objective lens and fixed relay lens are located may be normal to the optical path on which the optical path switch, the concave mirror and the target are located.

The optical path switch may comprise a pair of reflective prisms which are movable with respect to the optical axis of the transmission side objective lens and the relay lens.

The optical path switch may comprise a reflective mirror which is rotatable around the optical axis of the transmission side objective lens and the relay lens.

In the transmission type confocal laser microscope, adjustment of the illumination side objective lens for focussing is achieved by moving the specimen stage while the specimen is illuminated with the optical microscope unit which is similar to the prior art. The transmission side objective lens is adjusted for focussing as follows: The optical path from the transmission side objective lens to the concave mirror is switched to the target side. The specimen is illuminated with a light source for focus adjustment. Focussing on the target is achieved by adjusting the transmission side objective lens while observing the specimen through the optical microscope unit. Both objective lenses can be positioned in complete confocal points.

Since the transmission side objective lens comprises the movable objective lens unit and the stationary relay lens unit, focus adjustment is achieved by moving only the objective lens unit. Accordingly, the concave mirror, the optical path switch and the target which are in the rear of the relay lens can be incorporated in a stable fixed block.

BRIEF DESCRIPTION OF THE DRAWINGS

FIGS. 3(A) and 3(B) are views for comparing the shifts of the objective lens units of prior art transmission type confocal laser microscopes with each other.

DETAILED DESCRIPTION OF THE PREFERRED EXEMPLARY EMBODIMENT

Figure 1:
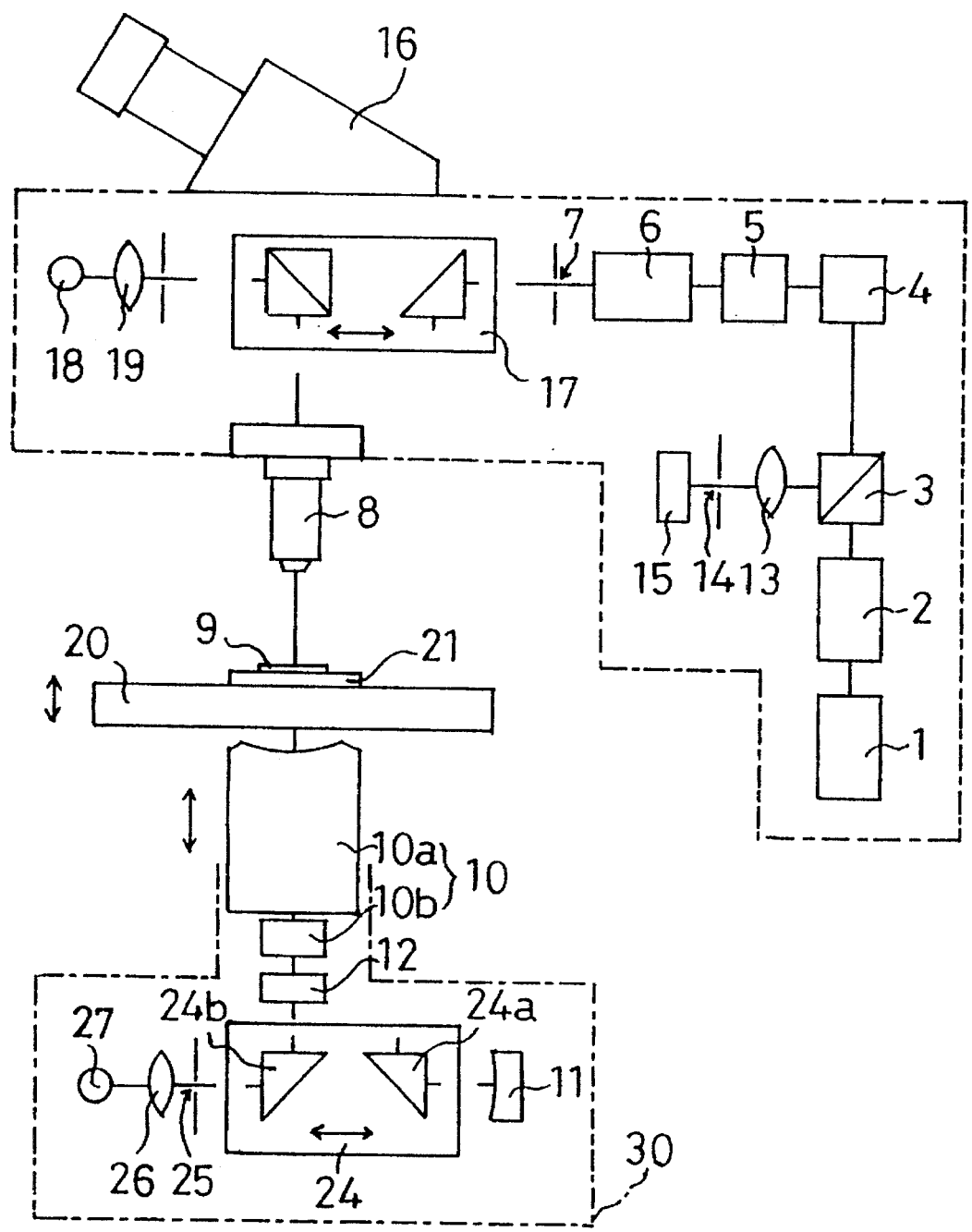
FIG. 1 is a schematic view showing one embodiment of the present invention.

An embodiment of the present invention will now be explained with reference to FIG. 1. Like parts corresponding to those of the above-mentioned prior art are represented by like reference numerals throughout the drawings. Detailed description of like parts will be omitted.

Figure 2:
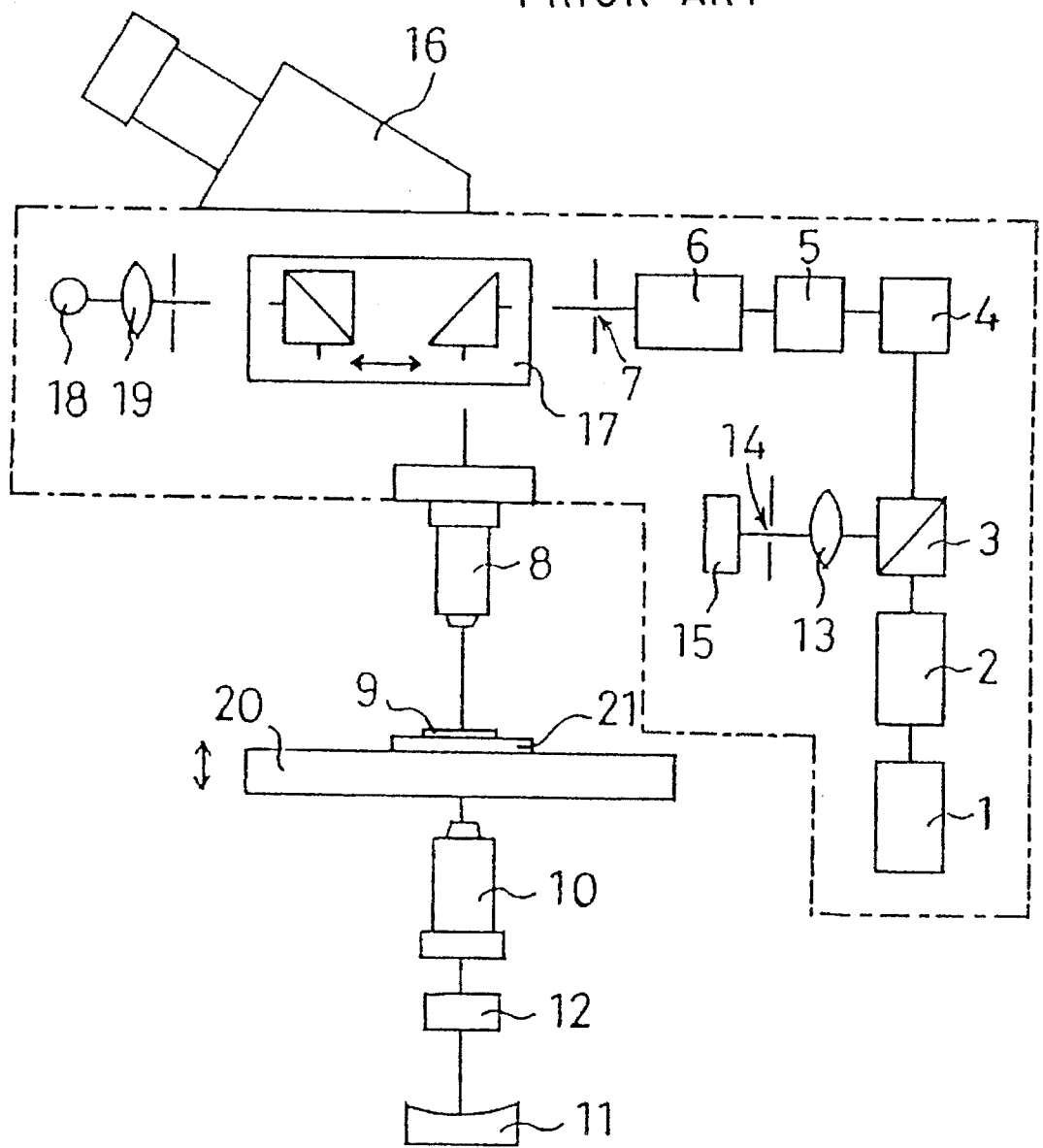
FIG. 2 is a schematic view showing a prior art.

The embodiment is identical with the prior art of FIG. 2 in structure of the optical system from tee light source 1 for emitting polarized laser light to the specimen 9 and the optical microscope unit from the light source for vertical overhead illumination and the binocular head 16 to the specimen 9 excepting the feature which will be described hereinafter. Accordingly, description of them will be omitted.

In the embodiment, the transmission side objective lens 10 below the specimen stage 20 comprises a relay lens unit 10b, the position of which is fixed and an objective lens unit 10a which is incorporated in such a manner that it is movable relative to the relay lens 10b. The objective lens unit 10a comprises a lens having characteristics equal to those of an objective lens having a focal length of infinity and the objective lens unit comprises a lens having charac-teristics equal to those of an imaging lens similar to a telescopic objective lens. The performance of the optical system behind the relay lens unit 10b is not changed even if the spacing between the objective lens unit 10a and the relay lens unit 10b is changed.

An optical path switch 24 is provided in the rear of the ¼λ wave length plate 12 in an optical path in the rear of the transmission side objective lens 10. The optical switch 24 comprises total reflective prisms 24a, 24b for changing the optical path normally in two directions. One total reflective prism 24a is adapted to bend the optical path toward the concave mirror 11 in a normal direction. The other total reflective prism 24b is adapted to bend the optical path toward a focus target 25.

The concave mirror 11 has a concave surface in a position where the laser light reflected from the prism 24a is imaged by the transmission side objective lens 10. The concave surface has a center which is located in the pupil position of the objective lens 10.

A target 25 comprises, for example, a circular ring and is positioned in an imaging position of the transmission side objective similarly to the reflective surface of the concave mirror 11. The target 25 is illuminated with a light source 27 via a relay lens 26. The components in the rear of the relay lens 26 are secured within a fixing block 30. The prisms 24a and 24b may be replaced with a rotatable single prism.

The thus formed laser microscope emits a polarized laser light from the light source 1 similarly to the conventional microscope as shown in FIG. 1. The emitted light is transmitted through the expander 2, the polarized beam splitter S, the Galvano-mirrors 4,5, the relay lens 6 and the field and illumination side objective lens 8. The laser light is focused upon the specimen 9 as a spot and is scanned therealong. The light which has been transmitted through the specimen 9 is transmitted through the transmission side objective lens 10 and the light is bent by the reflective prism 24a and is reflected on the concave mirror 11. The reflected light is reversed along the same optical path to reach the polarized beam splitter 3. Only the reflected light is reflected and is bent in a normal direction and is transmitted through the condensing lens 13 and is detected by the specimen signal detecting sensor comprising photoreceiving elements.

Adjustment of illumination side objective lens for focussing is conducted by lowering and elevating the specimen stage 20 while observing through the binocular head 16, the specimen 9 which is illuminated by a vertical overhead illumination light source as shown in FIG. 1.

Adjustment of the transmission side objective lens 10 for focussing on the target 25 is conducted by switching the optical path switch 24 into the optical path on the side of the target 25, turning the light source on and moving only the objective lens unit 10a while viewing the binocular head 16 without using the light source 18.

After both objective lenses 8 and 10 have been adjusted, the upper optical path switch 17 is actuated to switch the optical path from the optical microscope unit to the laser light emitting side optical path and the lower switch 24 is actuated to switch the optical path into the side of the concave mirror 11. The above-mentioned observation with laser light is conducted.

Alternatively, adjustment of the illumination side objective lens 8 for focussing on the specimen may be conducted while illuminating with the light source instead of the vertical overhead illumination light source 18.

In accordance with the present invention, the focussing target is positioned in a position which is optically equal to the concave mirror in an optical path behind the transmission side objective lens. Focussing adjustment is conducted while viewing through the optical microscope unit. Thus, adjustment of the transmission side objective lens for focussing can be achieved easily, quickly and higher accuracy.

The transmission side objective lens comprises the objective lens unit and the relay lens unit. Movement of only the objective lens unit will not change the optical path after the relay lens unit.

Components of the optical system including the relay lens unit, subsequent concave mirror and components existing up to the target can be incorporated within a common fixed block. Accordingly, a high precision transmission type confocal laser microscope in which the optical axes before and after the specimen stage are completely aligned with each other.

What is claimed is:

1. A transmission type confocal laser microscope comprising:
    a light producing means for producing a polarized laser spot light;
    a scanning means for scanning said laser spot light in vertical and transverse directions;
    a means for condensing said laser spot light through an illumination side objective lens so that said laser spot light is incident and scanned on a side of a specimen;
    a reflection means located on a reverse side of the specimen including a concave mirror located on a focal point of a transmission side objective lens for receiving said laser spot light passing through the specimen and reflecting and returning said laser spot light along the same optical path to a photoreceiving element;
    an optical path switch means arranged behind the transmission side objective lens for switching between a first optical path to said concave mirror and a second optical path toward a target means illuminated with a light source for use in focussing the transmission side objective lens, said target means being located on the focal point of transmission side objective lens.

2. A transmission type confocal laser microscope as recited in claim 1 in which said transmission side objective lens comprises an objective lens unit which is movable in a direction of an optical axis and a fixed relay lens unit, wherein movement of the objective lens unit for focus adjustment will not change the optical path on a side of the relay lens unit opposite the objective lens unit.

3. A transmission type confocal laser microscope as recited in claim 2 in which the optical path on which the transmission side objective lens and fixed relay lens are located is normal to the optical path on which the optical path switch, the concave mirror and the target are located.

4. A transmission type confocal laser microscope as recited in claim 2 in which said optical path switch comprises a pair of reflective prisms which are movable with respect to the optical axis of the transmission side objective lens and the relay lens.

* * * * *